June 5, 1923.
1,457,507

G. DELAGE
METHOD PERMITTING TO REGULATE AND ADJUST THE DYNAMIC CHARACTERISTICS
OF SURFACES MOVING THROUGH A FLUID
Filed Oct. 6, 1920

Inventor
G. Delage,
By H. R. Kerlake
Attorney

Patented June 5, 1923.

1,457,507

UNITED STATES PATENT OFFICE.

GUSTAVE DELAGE, OF PARIS, FRANCE, ASSIGNOR TO SOCIETE ANONYME DES ETABLISSEMENTS NIEUPORT, OF ISSY-LES-MOULINEAUX, SEINE, FRANCE.

METHOD PERMITTING TO REGULATE AND ADJUST THE DYNAMIC CHARACTERISTICS OF SURFACES MOVING THROUGH A FLUID.

Application filed October 6, 1920. Serial No. 415,134.

*To all whom it may concern:*

Be it known that I, GUSTAVE DELAGE, of 45 Rue Spontini, Paris, France, have invented new and useful Improvements in a Method Permitting to Regulate and Adjust the Dynamic Characteristics of Surfaces Moving Through a Fluid, of which the following is the specification.

This invention relates to a method which permits to vary the dynamic characteristics of surfaces moving through a fluid, and more particularly wing surfaces such as are employed in the construction of aeroplanes. This method consists essentially in disposing upon the principal surface moving in the fluid, suitable surfaces or planes of a supplementary nature whose position and inclination can be adjusted for the purpose of modifying the aerodynamic characteristics of the principal surfaces, as for instance, in the case of wing surfaces, the value of the sustaining power or the position of the center of pressure.

In the accompanying drawings and by way of example:

Figure 1:
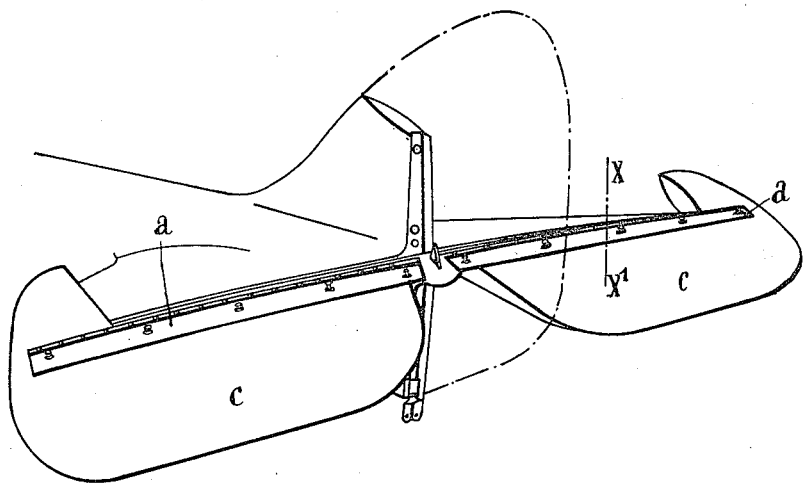
Fig. 1 shows the application of the method according to this invention to the movable rear planes of an aeroplane.
Figure 2:
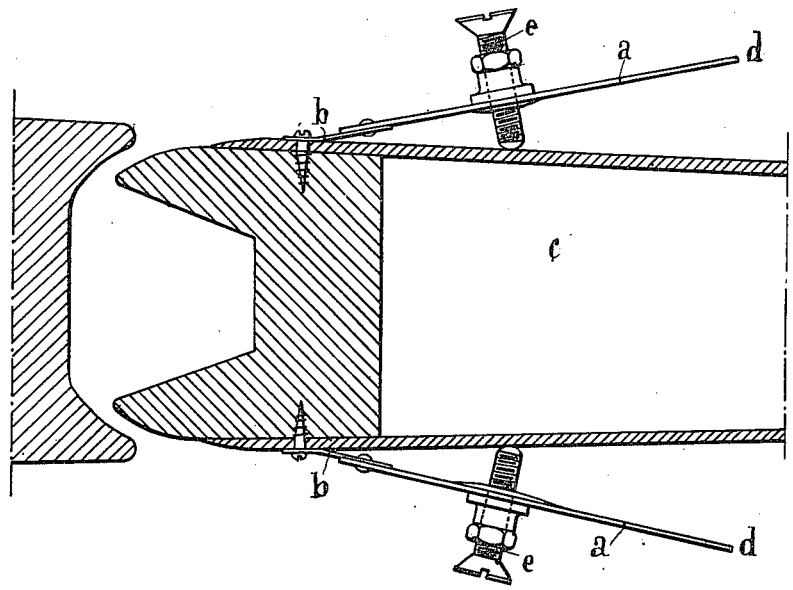
Fig. 2 is a cross section on a larger scale, of a form of construction of a device embodying the said method.

As above set forth, the method according to this invention consists essentially, for the purpose of modifying the dynamic characteristics of a surface moving through a fluid, in adding to the said surface suitable supplementary surfaces or planes whose position or inclination may be modified at will in such manner as to obtain the desired dynamic effects.

In its special application to aeroplanes, this method will therefore permit to vary the carrying power of the wing surface or the position of the center of pressure; whereby the adjustment of longitudinal or transverse equilibrium of the aeroplane can be modified.

In the example shown in the figures is represented a method of construction of the device according to this invention and the use of the same for the purpose of adjusting the longitudinal equilibrium of an aeroplane. The supplementary surfaces or planes are constituted by metal plates $a$ secured by one edge thereof $b$ to the wing surface $c$. The other edge $d$ is free, and the inclination of the plates can be modified by means of adjustment screws traversing said plates $a$ and bearing upon the wing surface $c$. In the example here represented, the said plates are disposed on either side of the movable planes $c$ constituting the rudder of the aeroplane for vertical steering. It will therefore suffice to change the inclination of the upper or lower plates $a$, according as the aeroplane has a tendency to move downwardly or upwardly, in order to adjust its longitudinal equilibrium, which result could only be hitherto obtained by modifying the wing surfaces themselves.

Having now described my invention, what I claim is new and desire to secure by Letters Patent is:

In a flying machine, the arrangement at any suitable point, on the surfaces subjected to aerodynamic reactions, of metallic strips inclined with respect to said surfaces, flexible plates on the edges of the metallic strips, on the one hand, and on the wing surfaces on the other hand; nuts attached on said metallic strips, screws passing through said nuts and bearing on the wing surface to permit of modifying the inclination of the metallic strips.

In testimony whereof I have signed my name to this specification.

GUSTAVE DELAGE.